United States Patent
Brown et al.

(10) Patent No.: US 10,460,020 B2
(45) Date of Patent: Oct. 29, 2019

(54) GENERATING SCHEMA-SPECIFIC DITA SPECIALIZATIONS DURING GENERIC SCHEMA TRANSFORMATIONS

(75) Inventors: Harlan Kent Brown, Durham, NC (US); Vanadis Mack Crawford, Raleigh, NC (US); John Edward Petri, Lewiston, MN (US); Leah Rae Smutzer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 3940 days.

(21) Appl. No.: 11/939,923

(22) Filed: Nov. 14, 2007

(65) Prior Publication Data

US 2009/0125804 A1    May 14, 2009

(51) Int. Cl.
*G06F 17/22*    (2006.01)
(52) U.S. Cl.
CPC ................................. *G06F 17/227* (2013.01)
(58) Field of Classification Search
CPC .. G06F 17/2247; G06F 17/218; G06F 17/227; G06F 17/30011; G06F 17/2229; G06F 17/2288; G06F 17/30908; G06F 8/73; G06F 17/211; G06F 17/2258; G06F 17/2264; G06F 17/248; G06F 17/2705; G06F 17/272; G06F 17/3089; G06F 7/00
USPC .................................................. 715/239, 255
See application file for complete search history.

(56) References Cited

U.S. PATENT DOCUMENTS

| | | | |
|---|---|---|---|
| 7,860,815 B1* | 12/2010 | Tangirala | 707/791 |
| 2006/0173821 A1* | 8/2006 | Hennum et al. | 707/3 |
| 2007/0136400 A1* | 6/2007 | Ames et al. | 707/205 |
| 2007/0277101 A1* | 11/2007 | Barber et al. | 715/539 |
| 2009/0113248 A1* | 4/2009 | Bock et al. | 714/39 |

OTHER PUBLICATIONS

Priestley, Michael et al., Specialization in DITA: Technology, Process, & Policy, Oct. 23, 2002, ACM, pp. 164-176.*
Day, Don, et al. "An XML Architecture for Technical Documentation: The Darwin Information Typing Architecture." Annual Conference-Society for Technical Communication. vol. 50. Unknown, 2003.*
Leslie, Donald M., "Transforming Documentation from the XML Doctypes used for the Apache Website to DITA: a Case Study" SIGDOC'01, Oct. 21-24, 2001, Copyright 2001 ACM.*

(Continued)

*Primary Examiner* — Nathan Hillery
(74) *Attorney, Agent, or Firm* — Martin & Associates, LLC; Bret J. Petersen (57) ABSTRACT

A method and apparatus produces documentation from customized extensible mark-up language (XML) by generating a schema-specific Darwin Information Typing Architecture (DITA) specialization. The DITA specialization is generated from XML schemas which define the XML documents. During the process of generating the DITA specialization, a XSL transform is also generated. The XSL transform is applied to the XML file to produce a DITA file that follows the rules of the DITA specialization. Prior art transforms can then be used to convert the DITA file and the DITA specialization to standard documentation. Generating schema-specific DITA specializations may be an automatic process or a dynamic process under the direction of a user.

4 Claims, 8 Drawing Sheets

(56) References Cited

OTHER PUBLICATIONS

DITA Version 1.1, Architectural Specification, OASIS Standard, Aug. 1, 2007.*
Priestley, Michael, et al. "DITA: An XML-based Technical Documentation Authoring and Publishing Architecture" Technical Communication, vol. 48, No. 3, Aug. 2001.*
http://en.wikipedia.org/wiki/Software_documentation, "Software documentation", pp. 1-3, printed Nov. 14, 2007.
http://www-03.ibm.com/industries/healthcare/doc/content/landingdtw/1160437105.html, "IBM Score: Regulatory compliance for the new millenium", p. 1, printed Nov. 14, 2007.
http://docs.oasis-open.org/dita/v1.0/archspec/ditaspecialization.html, "DITA Specialization", pp. 1-2, printed Nov. 14, 2007.

* cited by examiner

```
<medication name="amoxicillin">
  <description>
        Amoxicillin is an antibiotic that belongs
        penicillin family. Amoxicillin is used to
        treat bacterial infections such as infections
        of the middle ear, tonsils, and bronchi.
  </description>
  <brand-names>
        <drug-name>Amoxil</drug-name>
        <drug-name>Dispermox</drug-name>
        <drug-name>Trimox</drug-name>
  </brand-names>
</medication>
```

FIG. 3

```
<?xml version="1.0" encoding="UTF-8"?>
<xsd:schema xmlns:xsd="http://www.w3.org/2001/XMLSchema">
      <xsd:element name="medication">
      <xsd:annotation>
            <xsd:documentation source="title">Medical definition for
                              @name</xsd:documentation>
      </xsd:annotation>
      <xsd:complexType>
            <xsd:sequence>
      <xsd:element name="description" type="xsd:string" minOccurs="1" maxOccurs="1"/>
            <xsd:element name="brand-names">
                  <xsd:annotation>
                        <xsd:appinfo source="dita_map">dl</xsd:appinfo>
                        <xsd:documentation source="brand-names-head/title">Well known brand names for this medication</
                        <xsd:documentation>
                  </xsd:annotation>
            <xsd:complexType>
                  <xsd:sequence minOccurs="1" maxOccurs="unbounded">
            <xsd:element name="drug-name" type="xsd:string" />
                  </xsd:sequence>
            </xsd:complexType>
                  </xsd:element>
                        </xsd:sequence>
                        <xsd:attribute name="name" type="xsd:ID" />
      </xsd:complexType>
      </xsd:element>
</xsd:schema>
```

```
<?xml version="1.0" encoding="UTF-8"?>
<!DOCTYPE reference PUBLIC "-//DITA Reference//EN" "reference.dtd">
<medication id="amoxicillin" xml:lang="en-us">
<title>Medical definition for amoxicillin</title>
<description>
Amoxicillin is an antibiotic that belongs penicillin family. Amoxicillin
is used to treat bacterial infections such as infections of the middle
ear, tonsils, and bronchi.
</description>
<medication_body>
<section>
<brand-names>
<annotation>
<documentation>Brand Names:</documentation>
</annotation>
<drug-name>Amoxil</drug-name>
<drug-name>Dispermox</drug-name>
<drug-name>Trimox</drug-name>
</brand-names>
</section>
</medication_body>
</medication>
```

FIG. 5

Medical definition for amoxicillin
Amoxicillin is an antibiotic that belongs penicillin family. Amoxicillin is used to treat bacterial infections such as infections of the middle ear, tonsils, and bronchi.

Brand Names:
- Amoxil
- Dispermox
- Trimox

```
<xs:element name="medication">
    <xs:complexType mixed="true">
        <xs:complexContent>
            <xs:extension base="medication.class">
                <xs:attribute ref="class" default="- reference/reference medication/medication" />
            </xs:extension>
        </xs:complexContent>
    </xs:complexType>
</xs:element>
<xs:element name="medication_body">
    <xs:complexType mixed="true">
        <xs:complexContent>
            <xs:extension base="medication_body.class">
                <xs:attribute ref="class" default="- reference/refbody medication/medication_body" />
            </xs:extension>
        </xs:complexContent>
    </xs:complexType>
</xs:element>
<xs:element name="description">
    <xs:complexType mixed="true">
        <xs:complexContent>
            <xs:extension base="description.class">
                <xs:attribute ref="class" default="- topic/shortdesc medication/description" />
            </xs:extension>
        </xs:complexContent>
    </xs:complexType>
</xs:element>
<xs:element name="brand-names">
    <xs:complexType mixed="true">
        <xs:complexContent>
            <xs:extension base="brand-names.class">
                <xs:attribute ref="class" default="- topic/dl medication/brand-names" />
            </xs:extension>
        </xs:complexContent>
    </xs:complexType>
</xs:element>
<xs:element name="drug-name">
    <xs:complexType mixed="true">
        <xs:complexContent>
            <xs:extension base="drug-name.class">
                <xs:attribute ref="class" default="- topic/dlentry medication/drug-name" />
            </xs:extension>
        </xs:complexContent>
    </xs:complexType>
</xs:element>
<xs:element name="annotation">
<xs:complexType mixed="true">
        <xs:complexContent>
            <xs:extension base="annotation.class">
                <xs:attribute ref="class" default="- topic/dlhead medication/annotation" />
            </xs:extension>
        </xs:complexContent>
    </xs:complexType>
</xs:element>
<xs:element name="documentation">
    <xs:complexType mixed="true">
        <xs:complexContent>
            <xs:extension base="documentation.class">
                <xs:attribute ref="class" default="- topic/dthd medication/documentation" />
            </xs:extension>
        </xs:complexContent>
    </xs:complexType>
</xs:element>
```

GENERATING SCHEMA-SPECIFIC DITA SPECIALIZATIONS DURING GENERIC SCHEMA TRANSFORMATIONS

BACKGROUND

1. Technical Field

The disclosure and claims herein generally relate to automated documentation of computer software, and more specifically relate to generating schema-specific DITA specializations during generic schema transformations to produce documentation from customized extensible mark-up language (XML).

2. Background Art

Modern computer software systems are often extremely complex. Technical documentation of these complex software systems is an important part of the product's development lifecycle and cost. It is very important for the success of the product to document the various details about the product; for example, how the product's user interface functions, what its programming interfaces do, and how its components are installed or deployed. Computer system documentation must be written clearly and in a user friendly way so that a user can quickly understand the aspects of the product that are important to them. However, effectively documenting complex technical products is a daunting task.

In general, many software products today can be configured using XML. Typically, one or more XML grammars that can be understood or parsed by the product code are developed for the product's configuration data. For example, with some software products, a default configuration is shipped with the product so that the customer can use it "out of the box." In addition, the customer can develop their own set of configuration to fit their specific needs. This results in a couple of different technical documentation requirements. First, since the system's configuration is completely alterable by a customer, the details of the configuration schemas must be exposed. This type of documentation explains to the customer what each element in the schema means and how it could be configured. In addition, documentation is required for the default configuration since some customers will use the default configuration out of the box. In other words, a default configuration specification is needed so that the customer can understand the purpose for each of the default elements defined in the configuration.

The task of producing a configuration specification is especially daunting after a large set of complex XML configuration files have been customized. The normal process for documenting the information contained in these files would be to write an XSL transform for each file to generate HTML output (or other suitable output, such as PDF). Currently, however, this process is extremely inefficient as it requires a large information development effort. That is, it is very time consuming to have to create an XSL transform by hand for every possible schema in which the documentation of XML instance data is required.

What is needed is a method and apparatus for documentation of XML data with little intervention of the document creator, and where the document creator is not required to have knowledge of complicated programming and data structures. Without a way to further automate the documentation process, computer system development will continue to suffer from high documentation costs and lower documentation consistency.

BRIEF SUMMARY

An apparatus and method are described for producing documentation from customized extensible mark-up language (XML) by generating schema-specific Darwin Information Typing Architecture (DITA) specializations. The DITA specializations are generated from XML schemas which define the XML documents. During the process of generating the DITA specialization, an XSL transform may also be generated. The XSL transform is applied to the XML file to produce a DITA file that follows the rules of the DITA specialization. Prior art transforms can then be used to convert the DITA file and the DITA specialization to standard documentation. Generating schema-specific DITA specializations may be an automatic process or a dynamic process under the direction of a user.

The foregoing and other features and advantages will be apparent from the following more particular description, and as illustrated in the accompanying drawings.

BRIEF DESCRIPTION OF DRAWINGS

The disclosure will be described in conjunction with the appended drawings, where like designations denote like elements, and:

FIG. 10 is a block diagram to illustrate a partial DITA specialization schema for the example in FIGS. 2 through 6.

DETAILED DESCRIPTION

The description and claims herein are directed to a method and apparatus for producing documentation from customized extensible mark-up language (XML) by generating schema-specific Darwin Information Typing Architecture (DITA) specializations. The DITA specializations are generated from XML schemas which define the XML documents. During the process of generating the DITA specialization, an XSL transform is also generated. The XSL transform is applied to the XML file to produce a DITA file that follows the rules of the DITA specialization. Prior art transforms can then be used to convert the DITA file and the DITA specialization to standard documentation.

The Darwin Information Typing Architecture (DITA) provides a way for documentation authors and architects to create collections of typed topics that can be easily assembled into various delivery contexts. Topic specialization is the process by which authors and architects can define topic types, while maintaining compatibility with existing style sheets, transforms, and processes. The new topic types are defined as an extension, or delta, relative to an existing topic type, thereby reducing the work necessary to define and maintain the new type. The point of the XML-based Darwin Information Typing Architecture (DITA) is to create modular technical documents that are easy to reuse with varied display and delivery mechanisms, such as helpsets, manuals, hierarchical summaries for small-screen devices, and so on.

DITA specializations are an extension to the base DITA element definitions. They allow a specific grammar to describe document data that generally map to base DITA elements. DITA documents are easily extended, referenced, and merged into other documents. Schema-specific specializations aid in future documentation updates/maintainability/transformation because of their grammar specific representation (e.g. tag names correspond more closely to the actual content being documented).

Figure 1:
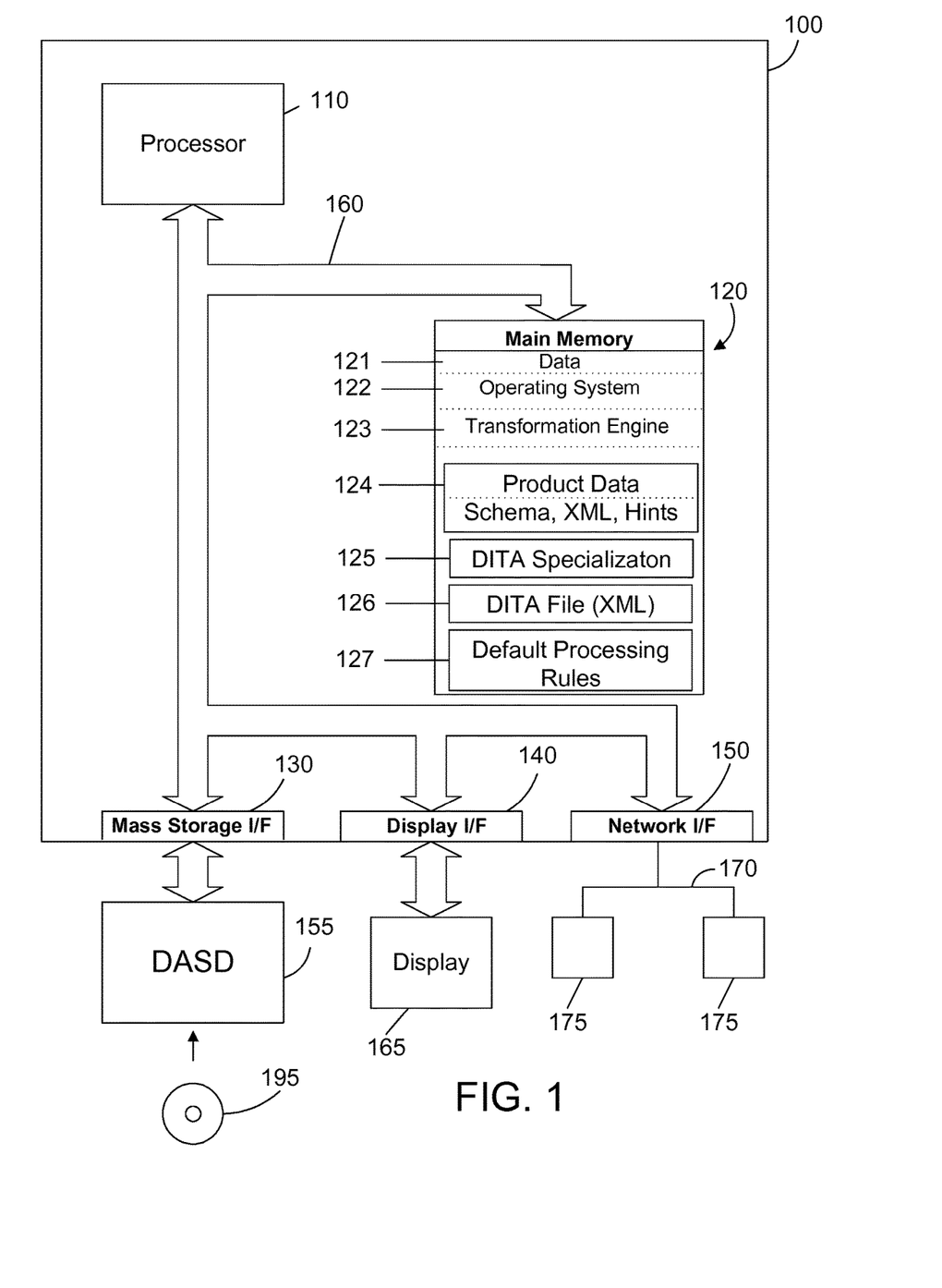
FIG. 1 is a block diagram of a computer system with a transformation engine as described herein.

Referring to FIG. 1, a computer system 100 is one suitable implementation of the apparatus and method described herein. Computer system 100 is an IBM System i computer system. However, those skilled in the art will appreciate that the methods and apparatus described herein apply equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system managers are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 contains data 121, an operating system 122, a transformation engine 123, product data 124, DITA specialization 125, DITA file (XML) 126, and default processing rules 127. Data 121 represents any data that serves as input to or output from any program in computer system 100. Operating system 122 is a multitasking operating system known in the industry as i5/OS; however, those skilled in the art will appreciate that the spirit and scope of this disclosure and claims are not limited to any one operating system.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, transformation engine 123, product data 124, DITA specialization 125, DITA file (XML) 126, and default processing rules 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Although computer system 100 is shown to contain only a single processor and a single system bus, those skilled in the art will appreciate that the improved transformation engine described herein may be practiced using a computer system that has multiple processors and/or multiple buses.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The transformation engine described herein applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the improved computer system and transformation engine has been and will continue to be described in the context of a fully functional computer system, those skilled in the art will appreciate that the computer system and transformation engine described herein is capable of being distributed as an article of manufacture in a variety of forms, and that the claims extend to all types of computer-readable media used to actually carry out the distribution. Examples of suitable computer-readable media include: recordable media such as floppy disks and CD-RW (e.g., 195 of FIG. 1).

Figure 2:
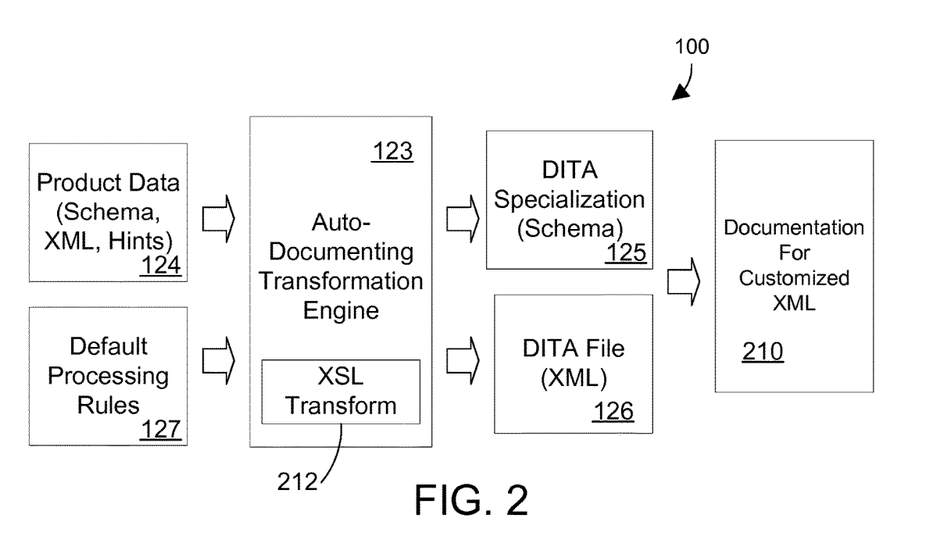
FIG. 2 is a block diagram of an auto-documenting transformation engine that creates a DITA specialization.

FIG. 2 shows a block diagram of a system 200 for producing documentation from customized extensible mark-up language (XML) 210 by generating a schema-specific DITA specialization 125. The prior art process for documenting the information contained in the XML files in Product Data 124 is to write an XSL transform for each file to generate HTML output (or other suitable output, such as PDF). However, this process is extremely inefficient as it requires a large information development effort to create an XSL transform by hand for every possible schema in which the documentation of XML instance data is required. In contrast to the prior art, a method and apparatus is described for producing documentation for customized extensible mark-up language (XML) 210 by generating a schema-specific DITA specialization (or DITA specialization schema) 125 and a DITA file 126 in XML format. The DITA specialization is generated by a transformation engine 123 from product data 124 that includes schemas, XML files, and hints. During the process of generating the DITA specialization, an XSL transform 212 or similar mapping is also generated. The XSL transform 212 is applied to the XML file to produce a DITA file 126 that conforms to the rules of the DITA specialization. Prior art transforms can then be used to convert the DITA file 126 and the DITA specialization schema 125 to standard documentation 210.

As introduced above, the transformation engine 123 uses a set of default processing rules 127 to assist in creating the DITA specialization 125. The default processing rules 127 may originate as a file of rules that is supplied with a product configuration. The default processing rules could also be managed or amended by the user of the system. When no default processing rules are available for a schema element, the transformation engine may attempt to automatically generate a processing rule. Rules can be generated by the transform engine by detecting similarities between the schema and the DITA elements. The similarities that may be used include detection of element names, element types, identification attributes and element structures. Other suitable heuristics could also be used to automatically generate processing rules. The process of automatically generating processing rules is described further below.

Figure 3:
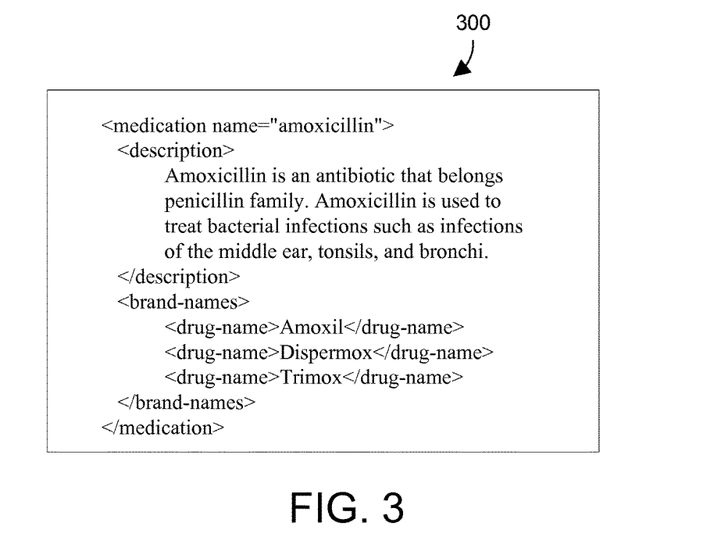
FIG. 3 is a simple XML file to illustrate an example herein of producing documentation from customized XML by generating schema-specific DITA specializations.
Figure 4:
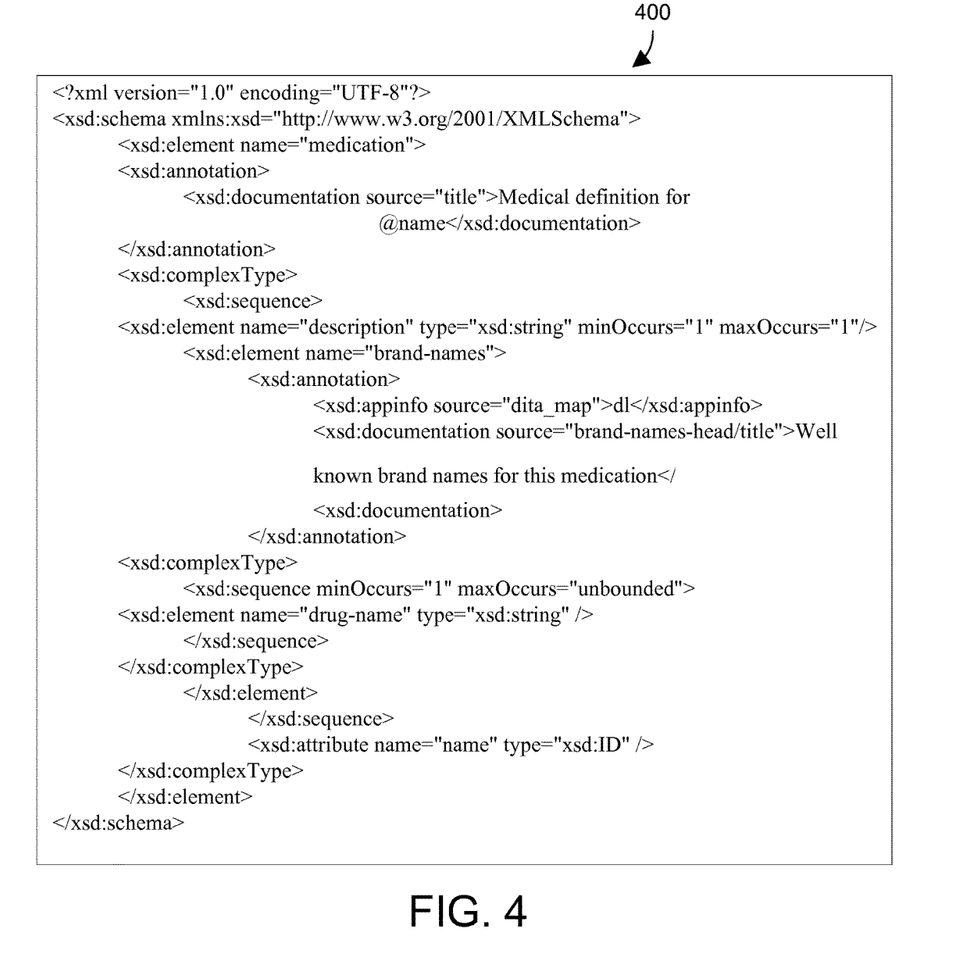
FIG. 4 is a schema for the example XML file show in FIG. 2.

FIGS. 3 through 5 in conjunction with the paragraphs below describe an example of generating schema-specific DITA specializations that can then be utilized to produce documentation from customized extensible mark-up language (XML). FIG. 3 shows a data listing that provides a simple XML file to illustrate an example of producing documentation from customized XML by generating schema-specific DITA specializations. XML file 300 in FIG. 3 is a suitable example of an XML file in Product Data 124 in FIGS. 1 and 2. FIG. 4 shows a data listing that provides a schema corresponding to the XML file in FIG. 3, which is an example of a suitable schema in Product Data 124 in FIGS. 1 and 2. The auto-documenting transformation engine 123 (FIG. 1) reads the schema in FIG. 4 as well as a defined set of processing rules. The auto-documenting transformation engine then uses the processing rules to determine how to create a DITA specialization based on the schema. In addition to leveraging the defined processing rules, the engine may be configured to automatically apply or suggest new specialized elements based solely on similarities it has detected between the schema and the DITA base type(s). Thus, the auto-documenting transformation engine allows for a policy-based, dynamic form of generation, as well as a completely automated form of generation, or a combination of both. This process is applied to the schema file in FIG. 4, to produce a DITA specialization. The DITA specialization 125 is illustrated as a Specializations to DITA elements map in Table 2 below. The DITA specialization is further represented as a partial schema file showing the relevant portions in FIG. 10.

An example process to create a DITA specialization in FIG. 2 from the schema shown in FIG. 4 is as follows:
1. The main element of the schema ("medication") is mapped to a DITA reference according to a default processing rule that is stored with the system as represented in Table 1. This results in the first row below the heading in Table 2 of "Medication" and "reference", as well as the corresponding mapping in the DITA specialization file in FIG. 10.
2. By automatically interrogating the base DITA type(s) the transformation engine knows that a reference element needs a refbody/section structure to contain most of its data. Thus, an appropriate child element "medication_body" is generated. Note that the generation of this element resulted from the transformation engine's automated generation mechanism, not from a default processing rule. Also note that the name of this element corresponds to the terminology, namely "medication", of the schema being processed.
3. The description element is automatically determined by the transformation engine and is placed first and allowed only once. It looks like a "description" element and is mapped to the DITA shortdesc element. Note that the generation of this element resulted from the transformation engine's automated generation mechanism (i.e. based on the similarity detected between the "description" element in the schema and the "shortdesc" element from the DITA type), not from a default processing rule.
4. The brand-names element has supplied a dita_map value in the appinfo section. Accordingly, brand-names is mapped to the DITA dl element by the transformation engine based on this processing rule (hint within the schema).
5. It is noted that brand-names have documentation. A specialization is generated so this is formatted as a DITA dlhead element based on a default processing rule (not shown) pertaining to the documentation element.
6. All repeating child elements (drug-name) are mapped to DITA dlentry according to a default processing rule (not shown). In this case a default processing rule (not shown) indicates that if a repeating element is encountered in the schema being processed, that it should be mapped to this particular DITA element.

TABLE 1

| Default Processing Rules | |
| --- | --- |
| Map Schema element to: | DITA element |
| main element of the schema | reference |

TABLE 2

| Specializations to DITA elements map | |
| --- | --- |
| Specialization | Base DITA element |
| medication | Reference |
| medication/medication_body/section (system generated) | Reference/refbody/section |
| description | Shortdesc |
| brand-names | dl |
| brand-names/drug-name | dl/dlentry |
| brand-names/annotation/documentation | dl/dlhead/dthd |

In addition to the above process, the transformation engine further processes the schema to create the transform that will be used to turn the XML document into a DITA document. This transform may take the form of an XML stylesheet language transform (XSLT or XSL transform), but it is just a mapping and could be of some other format. The transformation engine will look for hints in the schema to match the elements.

An example process to create a transform from the schema in FIG. 4 is as follows:
1. The transformation engine will create a base transformation that will generate correct DITA headers
2. The transformation engine will try to apply the correct attributes to DITA elements. Example: reference needs an id attribute. The medication element has an xsd:ID type attribute. (Or maybe it would look for an attribute called name). This will map to reference id.
3. The transformation engine will look for notes in the schema as to what to transform.
4. The transformation engine defines that data in a documentation source attribute will be used as a DITA tag. The <xsd:documentation source="title">Medical definition for @name</xsd:documentation> section will be transformed to be surrounded by a title element.

5. The transformation engine defines that some xpath can be used within the documentation tags and will be resolved. The @name value is resolved with the value assigned to the name attribute.

6. All unneeded schema data is stripped away.

TABLE 3

XML file to DITA file transform (XSL transform)

| Med.xsd | DITA element |
|---|---|
| medication@name | reference@id |
| description@title | Title |

Figure 5:
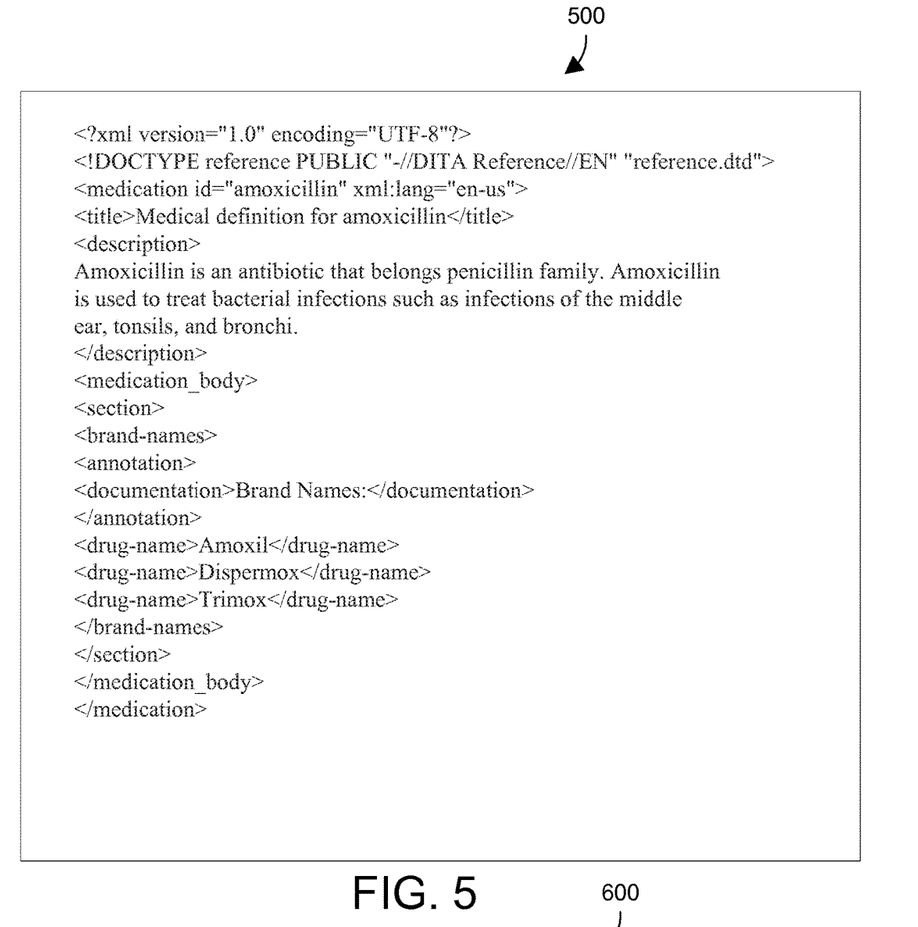
FIG. 5 shows an output DITA file for the example XML file and schema shown in FIGS. 3 and 4.
Figure 6:
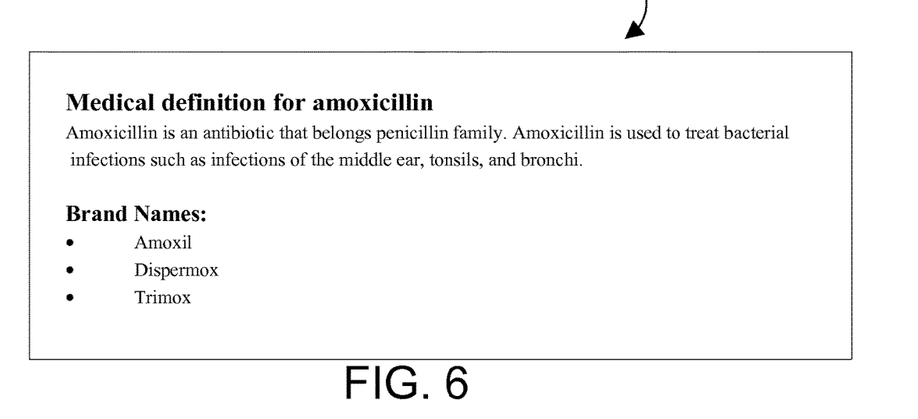
FIG. 6 shows an output text file for the DITA file shown in FIG. 5.

The transformation engine now can use an XSL Transform which uses the above mappings in Table 3 to create the DITA file 126. The transform is applied to the XML file shown in FIG. 3 in a manner known in the prior art for DITA transforms. The resulting DITA file would look like the file shown in FIG. 5. The DITA file 500 and the DITA specialization 1000 in FIG. 10 can then be processed using standard prior art processes to produce an output file such as that shown in FIG. 6. The output file 600 in FIG. 6 represents a document file such as a portable document format (pdf) file.

As described above, the auto-documenting transformation engine allows for a policy-based, dynamic form of mapping generation, as well as a completely automated form of generation, or a combination of both. The transformation engine may also be configured by the user to choose automatic mapping generation when there is not a default mapping in the rules, or to consult the user to generate a missing mapping.

Figure 7:
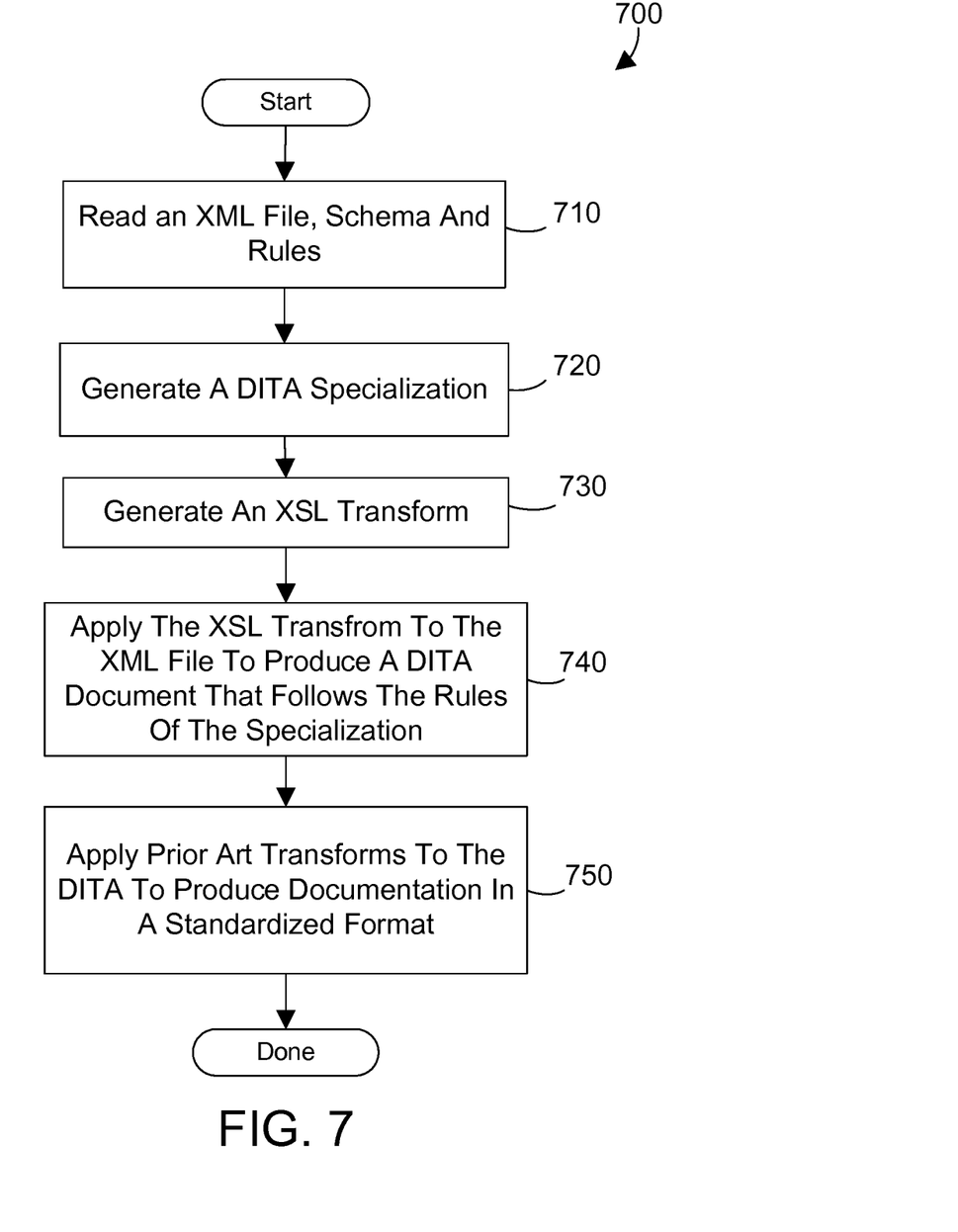
FIG. 7 is a flow diagram of a method for producing documentation from customized extensible mark-up language (XML) by generating schema-specific DITA specializations.

FIG. 7 shows a method 700 for producing documentation from customized extensible mark-up language (XML) by generating schema-specific DITA specializations. The steps in method 700 are typically performed by a computer system. First, read an XML file, a schema and a set of processing rules (step 710). Next, generate a DITA specialization (step 720). Generate a mapping such as an XSL transform (step 730). Then apply the XSL transform to the XML file to produce a DITA document that follows the rules of the specialization or is in the specialization format (step 740). Finally, apply prior art transforms to the DITA document to produce documentation in a standard format (step 750). The method is then done.

Figure 8:
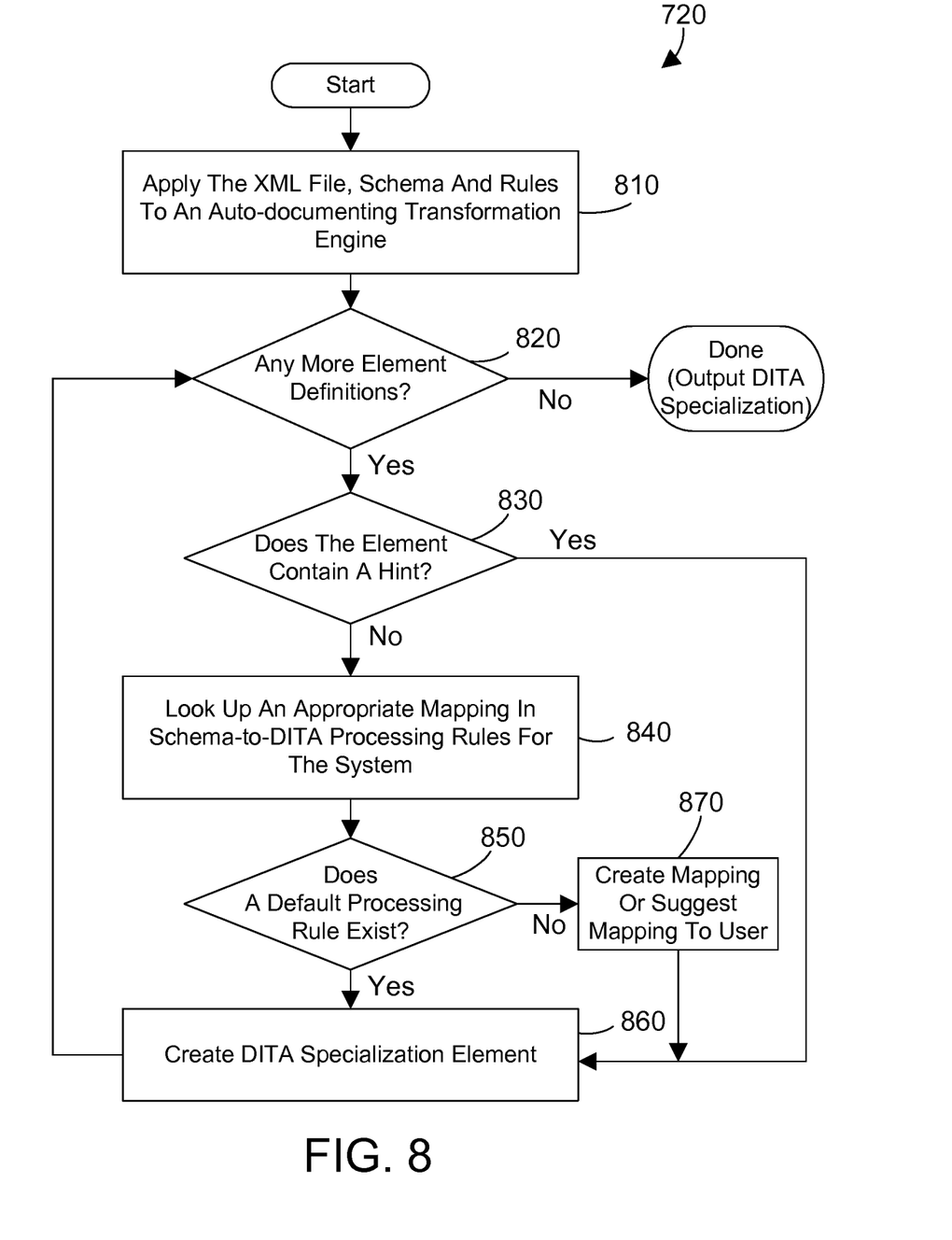
FIG. 8 is a flow diagram to illustrate a possible implementation of step 720 in FIG. 7.

FIG. 8 shows a flow diagram to illustrate a method 720 as a possible implementation of step 720 in FIG. 7. The method first produces a DITA specialization by applying an auto-documenting transformation engine to the schema and processing rules (step 810). Each element definition of the schema is inspected. If there are more element definitions (step 820=yes) then if the element definition does not contains a hint (step 830=no) then look up an appropriate mapping in the supplied default processing rules for the system (step 840). If an appropriate default processing rule exists (step 850=yes) then create a DITA specialization for the element (step 860). If an appropriate default processing rule does not exist (step 850=no) then create a mapping for the element or suggest a mapping to the user and allow the user to verify the mapping (step 870), then create a DITA specialization element (step 860). If the element definition contains a hint (step 830=yes) then create a DITA specialization for the element using the hint (step 860). If there are no more element definitions (step 820=no) then the method is done.

Figure 9:
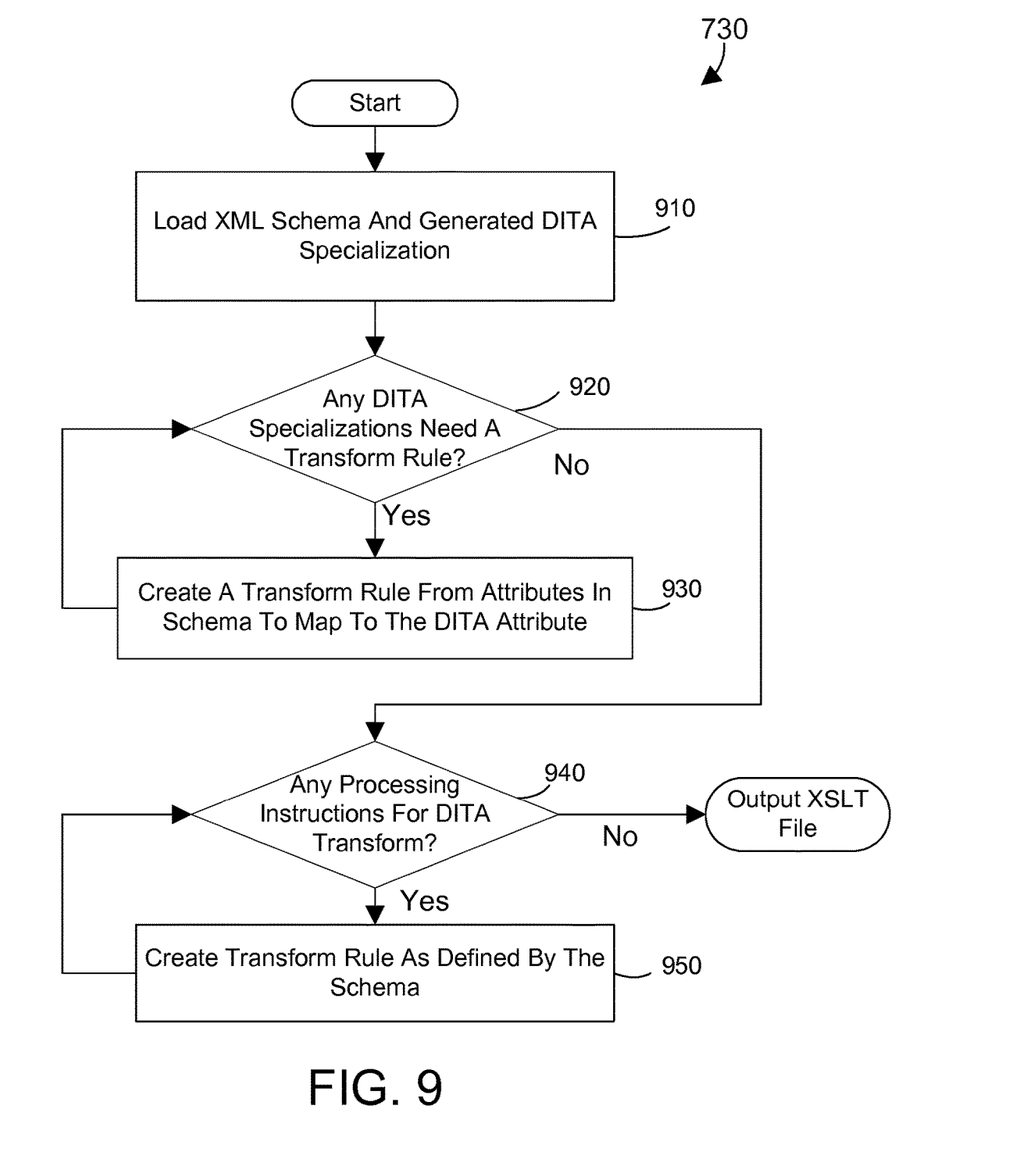
FIG. 9 is a flow diagram to illustrate a possible implementation of step 730 in FIG. 7.

FIG. 9 shows a flow diagram to illustrate a method 730 as a possible implementation of step 730 in FIG. 7. Load XML schema and the generated DITA specialization (step 910). If any DITA specializations need a transform rule (step 920=yes) then create a transform rule from the attribute in the schema to map to the DITA attribute (step 930) then go back to step 920. If there are not any DITA specializations that need a transform rule (step 920=no), then go to step 940. If there are any processing instructions for the DITA transform (step 940=yes) then create a transform rule as defined by the schema (step 950) and go back to step 940. If there are no processing instructions for the DITA transform (step 940=no) then the method is done (output the XSLT file for the next step in method 700).

One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

What is claimed is:

1. A computer system for producing documentation from customized extensible mark-up language (XML) comprising:
   at least one processor;
   a memory coupled to the at least one processor;
   a schema associated with a customized XML file residing in the memory; and
   a transformation engine that generates a schema-specific Darwin Information Typing Architecture (DITA) specialization from the schema;
   wherein the transformation engine also produces a transform from the schema that when applied to the XML file produces a DITA file that follows the rules of the DITA specialization;
   wherein the DITA specialization and the DITA file are used to generate documentation for the customized XML file; and
   wherein the transformation engine automatically determines a mapping for a DITA specialization element based on similarities it has detected between the schema and a DITA base type for the element.

2. A computer system for producing documentation from customized extensible mark-up language (XML) comprising:
   at least one processor;
   a memory coupled to the at least one processor;
   a schema associated with a customized XML file residing in the memory; and
   a transformation engine that generates a schema-specific Darwin Information Typing Architecture (DITA) specialization from the schema;
   wherein the transformation engine also produces a transform from the schema that when applied to the XML file produces a DITA file that follows the rules of the DITA specialization;
   wherein the DITA specialization and the DITA file are used to generate documentation for the customized XML file; and
   wherein an element of the schema is mapped to a DITA element in the DITA specialization according to a default processing rule that is stored with the system.

3. A computer system for producing documentation from customized extensible mark-up language (XML) comprising:
   at least one processor;
   a memory coupled to the at least one processor;

a schema associated with a customized XML file residing in the memory; and a transformation engine that generates a schema-specific Darwin Information Typing Architecture (DITA) specialization from the schema;

wherein the transformation engine also produces a transform from the schema that when applied to the XML file produces a DITA file that follows the rules of the DITA specialization;

wherein the DITA specialization and the DITA file are used to generate documentation for the customized XML file; and wherein an appropriate child element is generated automatically based on the similarity detected between an element in the schema and an element from a DITA type.

4. A computer implemented method for producing documentation from customized extensible mark-up language (XML) comprising, the method comprising the steps of:

reading a customized XML file, schema, and default processing rules;

generating a Darwin Information Typing Architecture (DITA) specialization, wherein the step of generating the DITA specialization further comprises the steps of:

creating a DITA specialization element for each element of the schema that has an associated hint;

where the element of the schema does not have a hint, looking up an appropriate default processing rule, and where an appropriate processing rule exists, then creating a DITA specialization element, where there is not an appropriate processing rule then creating a processing rule;

generating a first transform;

applying the first transform to the customized)ML file to produce a DITA file that follows the rules of the DITA specialization; and applying a second transform to the DITA specialization and the DITA file to produce documentation for the customized XML file.

* * * * *